(No Model.)
J. M. BENDER.
TIRE UPSETTER OR SHRINKER.
No. 582,033. Patented May 4, 1897.
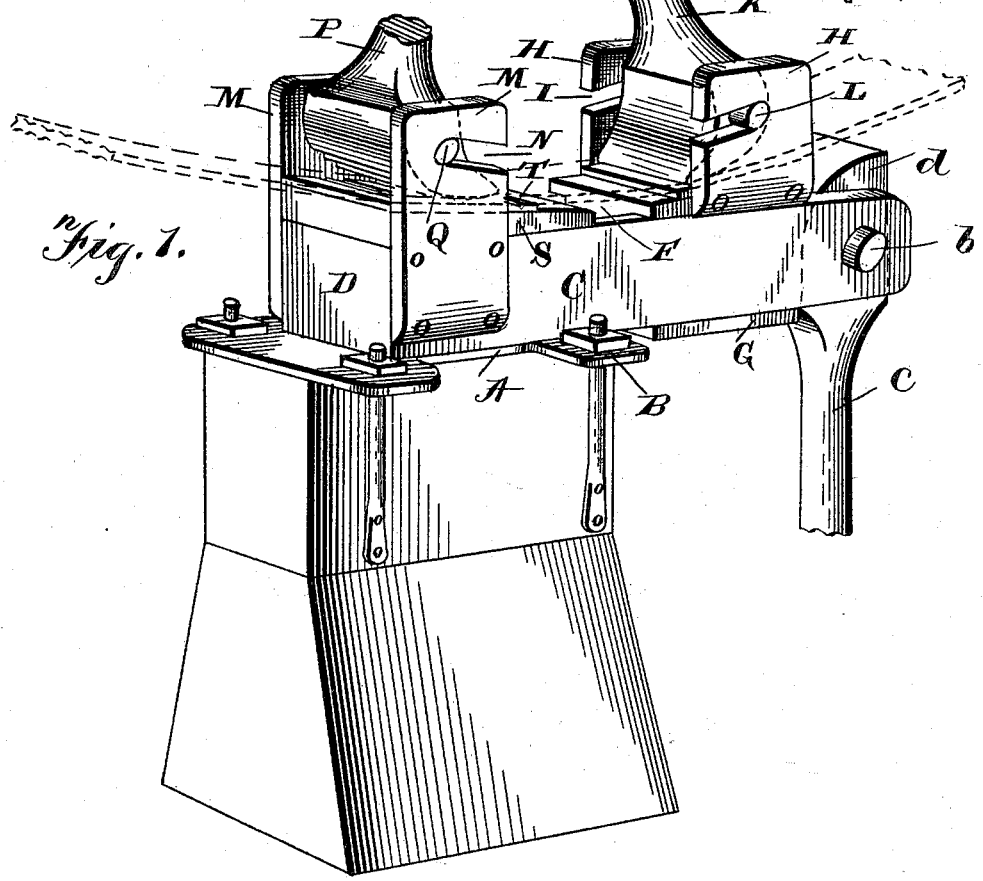
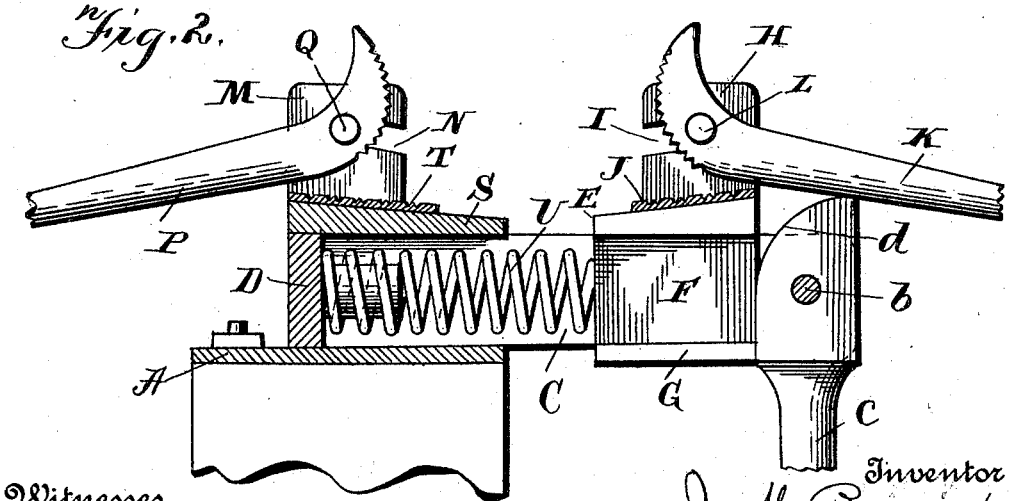
Witnesses
Geo. E. Frech
James W. Beraus
Inventor
J. M. Bender
by Pattison & Nesbit,
Attorney's

UNITED STATES PATENT OFFICE.

JOHN M. BENDER, OF ALEXANDRIA, LOUISIANA.

TIRE UPSETTER OR SHRINKER.

SPECIFICATION forming part of Letters Patent No. 582,033, dated May 4, 1897.

Application filed November 18, 1896. Serial No. 612,638. (No model.)

*To all whom it may concern:*

Be it known that I, JOHN M. BENDER, of Alexandria, in the parish of Rapides and State of Louisiana, have invented certain new and useful Improvements in Tire Upsetters or Shrinkers; and I do hereby declare the following to be a full, clear, and exact description of the invention, such as will enable others skilled in the art to which it pertains to make and use it, reference being had to the accompanying drawings, which form part of this specification.

My invention relates to improvements in tire upsetters or shrinkers; and it consists in the specific construction and arrangement of parts, which will be fully described hereinafter and especially referred to in the claims.

The object of my invention is to provide a specifically-constructed tire upsetter or shrinker by means of which the tire can be placed therein and then shrunk, the device adapted to be connected to a standard, block, or table or other support and projecting therebeyond for the follower-head and operating-handle, all of which will be fully described hereinafter.

Referring to the drawings, Figure 1 is a perspective view of a machine embodying my invention, showing it attached to a standard or other support. Fig. 2 is a longitudinal vertical section of the same, showing it upon the support.

Referring now to the drawings, A represents a base provided with openings B, by means of which the machine is clamped to a standard, table, or other support by means of bolts or screws. Formed as a part of or rigidly secured to the base A are vertically-extending webs C, being closed at their inner ends by means of a back D, and these webs extend a considerable distance beyond the base, as clearly shown. Moving between the webs C beyond the base A, the webs in fact forming projecting arms, is a follower or head E. This follower is provided with a vertical portion F, fitting between the projecting arms C, and connected to the lower end of this portion F is a cross-head G. This cross-head G is beyond the support, as shown, so that the support does not in any way interrupt its movement. The upper end of the portion F of this follower is provided with the vertically-extending ears H at opposite sides thereof, and these ears H are provided with inwardly-extending open-ended slots I. The head E between the said ears H is roughened, as shown at J, and a cam K, provided with projecting pivotal points L, is adapted to fit in the slots I. This cam is also roughened upon its cam-surface, as shown, and coacts with the roughened surface upon the head E. By means of the open-ended slots I the cam is readily removed from its supporting-ears H for the purpose to be set forth hereinafter.

Projecting from the sides of the webs or arms C at their inner or rear ends are the ears M, having at the inner sides of their upper ends open-ended slots N, which likewise receive a cam P, having the pivotal projections or pins Q, adapted to enter and rest in said slots N. The upper inner ends of the webs or arms C are covered with a covering or top S, having a roughened clamping-surface T, which coacts with the roughened clamping-surface of the cam P in the same manner as the cam K with the roughened surface of the follower-head. The inner ends of the webs or arms C are therefore closed by the top S and the back D, forming a closed housing, and in this is situated an expanding coiled spring U, having its inner end resting against the inner side of the back D and its outer end resting against the follower E. This spring therefore tends to hold the follower normally outward, as will be readily understood.

The projecting ends of the arms C support an operating cam-lever *c* through the medium of a pivotal pin *b*, extending through the lever and the ears, as clearly shown. The outer side of the head or follower E is at all times in normal engagement with the cam-surface *b* of the cam-lever *c* through the medium of the spring, as will be readily understood.

In operation the cam-levers K and P are removed and the tire placed between the ears H and M, as shown in Fig. 1, and the cam-levers then placed in position by sliding their pivotal points in the slots of the ears M and H, and then the cams are forced inward at the upper or handle ends, thus clamping the tire to the follower and to the stationary clamping-surface T of the cover S. By an upward movement of the operating-handle *c* the follower E is forced inward, thus contracting or shrinking the tire, as will be readily understood. This operation will be continued throughout several portions of the tire if necessary to make a proper amount of contraction.

It will be noticed from Fig. 1 that the operating-lever c is normally downward, so that it is out of the way of the adjacent clamping lever or cam K. By providing the bed A with the projecting arms, between which the operating-lever is pivoted and under which the cross-head moves, the support does not interfere, as before stated, with the movement of the cross-head, while the extremities of the arms or webs C project beyond the table and permit the operating-lever c to assume its normal position, as illustrated in Fig. 1.

From the above description it will be seen that I provide a simple machine, adapted to clamp the flat surface of the tire in a firm and reliable manner to accomplish the shrinking of the tire.

I am aware that it is not novel to provide a shrinker with a stationary and a movable clamping surface or head and a lever for moving the head. I do not make any claim to such a construction broadly, but the specific construction of my shrinker is essentially different from those previously constructed.

Having thus fully described my invention, what I claim, and desire to secure by Letters Patent, is—

1. A tire-shrinker consisting of a horizontal base A provided at its upper face with the parallel webs C, a stationary clamping-surface spanning the upper edge of said webs at a point over the said base, parallel arms M projecting upward from said webs at opposite sides of said clamping-surface, a cam-arm pivoted between said arms M and coacting with the stationary clamping-surface, the webs C projecting beyond said base, a cam-operating lever pivotally supported between the extremities of said webs, a movable follower situated between said extending webs at a point between the cam-lever and the stationary clamping-surface, the follower having supporting-shoulders interlocking with said webs and carrying a clamping-surface at a point above the upper edges of the webs, the clamping-surface having upwardly-extending arms at opposite sides thereof, and a cam-arm pivotally supported by said arms and coacting therewith, substantially as described.

2. A shrinker consisting of a base A, the arms C projecting beyond and longitudinal the base, a follower movable between the arms beyond the base, the follower carrying a horizontal clamping device, the rear inner ends of the arms having a horizontal clamp at their upper sides, at a point over the base, the rear ends of the arms or webs being closed by a back, thus forming a housing between the stationary clamping-surface and the base A, a spring situated in the said housing having one end engaging the backing and the other engaging the inner side of the follower, and an operating-lever pivotally supported between the projecting extremities of the arms or webs C and in contact with the outer face of the follower, substantially as described.

In testimony whereof I affix my signature in presence of two witnesses.

JOHN M. BENDER.

Witnesses:
ANZER SIERS,
J. D. PETHUDY.